(12) United States Patent
Zeng

(10) Patent No.: US 10,892,616 B2
(45) Date of Patent: Jan. 12, 2021

(54) SAFE PROCESSING METHOD FOR ACTIVE VOLTAGE REDUCTION OF GROUND FAULT PHASE OF NON-EFFECTIVE GROUND SYSTEM

(71) Applicant: CHANGSHA UNIVERSITY OF SCIENCE AND TECHNOLOGY, Hunan (CN)

(72) Inventor: Xiangjun Zeng, Hunan (CN)

(73) Assignee: CHANGSHA UNIVERSITY OF SCIENCE AND TECHNOLOGY, Hunan (CN)

( * ) Notice: Subject to any disclaimer, the term of this patent is extended or adjusted under 35 U.S.C. 154(b) by 0 days.

(21) Appl. No.: 16/613,409

(22) PCT Filed: Jul. 4, 2018

(86) PCT No.: PCT/CN2018/094402
§ 371 (c)(1),
(2) Date: Nov. 13, 2019

(87) PCT Pub. No.: WO2019/007348
PCT Pub. Date: Jan. 10, 2019

(65) Prior Publication Data
US 2020/0083702 A1   Mar. 12, 2020

(30) Foreign Application Priority Data
Jul. 6, 2017 (CN) .......................... 2017 1 0550400

(51) Int. Cl.
*H02H 9/08* (2006.01)
*H02H 9/00* (2006.01)

(52) U.S. Cl.
CPC ................................. *H02H 9/002* (2013.01)

(58) Field of Classification Search
CPC ........ H02H 9/002; H02H 3/162; H02H 3/331; H02H 11/005; H02H 9/08; H02J 3/12
See application file for complete search history.

(56) References Cited

U.S. PATENT DOCUMENTS 3,286,129 A * 11/1966 Gagniere ............... H02H 3/165
361/47
4,156,884 A * 5/1979 Eckart .................... H02H 3/331
361/46
(Continued)

FOREIGN PATENT DOCUMENTS

| CN | 1645705 | 7/2005 |
| CN | 1912642 | 2/2007 |

(Continued)

OTHER PUBLICATIONS

"International Search Report (Form PCT/ISA/210) of PCT/CN2018/094402," dated Sep. 4, 2019, with English translation thereof, pp. 1-4.

Primary Examiner — Thai T Dinh
(74) Attorney, Agent, or Firm — JCIP Global Inc.

(57) ABSTRACT

The proposed invention discloses a safe processing method for active voltage reduction of a ground fault phase of a non-effective ground system, for use in safe processing of a ground fault of a neutral point non-effective ground generator or distribution network. Non-effective ground system side windings of a transformer are equipped with a plurality of shunting taps. When a single-phase ground fault occurs, the shunting tap of the fault phase winding is selected to be short-circuited to ground directly or through an impedance to reduce the fault phase voltage to ensure that the fault point voltage is less than the continuous burning voltage of a ground arc to meet a long-term non-stop safe operation requirements. The proposed method can eliminate the instantaneous single-phase ground fault, suppress the per- (Continued)

manent single-phase ground fault current, and limit the rising amplitude of non-fault phase voltage and the risk of non-fault phase insulation breakdown.

10 Claims, 6 Drawing Sheets

(56) References Cited

U.S. PATENT DOCUMENTS

| | | | | |
|---|---|---|---|---|
| 4,685,022 A * | 8/1987 | Nichols, III | ............. | H02H 3/33 |
| | | | | 361/42 |
| 6,504,691 B1 * | 1/2003 | Matsui | ................... | H02H 3/162 |
| | | | | 361/38 |
| 7,301,739 B2 * | 11/2007 | Hamer | ................... | H02H 7/261 |
| | | | | 361/42 |

FOREIGN PATENT DOCUMENTS

| | | |
|---|---|---|
| CN | 102074950 | 5/2011 |
| CN | 104662761 | 5/2015 |
| CN | 107147096 | 9/2017 |
| WO | 2012013165 | 2/2012 |

* cited by examiner

SAFE PROCESSING METHOD FOR ACTIVE VOLTAGE REDUCTION OF GROUND FAULT PHASE OF NON-EFFECTIVE GROUND SYSTEM

CROSS-REFERENCE TO RELATED APPLICATION

This application is a 371 of international application of PCT application serial no. PCT/CN2018/094402, filed on Jul. 4, 2018, which claims the priority benefit of China application no. 201710550400.3, filed on Jul. 6, 2017. The entirety of each of the above mentioned patent applications is hereby incorporated by reference herein and made a part of this specification.

BACKGROUND

Technical Field

The present invention relates to the technical field of power system ground fault suppression, in particular to a safe processing method for active voltage reduction of a ground fault phase of a non-effective ground system.

Related Art

Domestic and international generator sets and distribution networks generally adopt neutral point non-effective ground methods, and the non-effective ground system constitutes more than 95% of China's 6 kV and higher voltage level power grids. Nearly 70% of power outages are caused by faults of the system. The annual power outage losses have reached hundreds of billions of RMB. The non-effective ground system is different from a power transmission system, and the ground fault resistance is as high as several tens of kilohms, which is difficult to detect and protect. Long-term operation with faults endangers personal and equipment safety, and causes serious social and economic losses. Ground faults are prone to electric shocks, and the number of deaths per year is as high as thousands, second only to traffic accidents. Ground faults are prone to are overvoltages, causing equipment to burn out and even causing "fire spread" accidents. Ground faults of large-scale units cannot be extinguished in time. Arc currents easily cause iron cores and windings to burn out, causing accident expansion and even fatal crash. A trip caused by a ground fault causes a power outage, which reduces power supply reliability and directly affect industrial production and people's living standards. Ground fault safety operation of the non-effective ground system is critical to grid security and even national security.

The conventional ground fault processing and operation modes of the non-effective ground system mainly include fault suppression and fault removal.

The ground fault suppression mainly realizes ground fault suppression of the non-effective ground system by reforming or controlling the neutral point grounding mode of a primary system of a power grid, adjusting the neutral point ground impedance and suppressing the voltage and current of a fault point, but can only run for 1 to 2 h, is prone to overvoltage, and has security risks.

Ground fault removal is mainly to select a fault line and cut off the fault point as soon as possible after the ground fault of the system occurs, so as to ensure the safe operation of the system. For example, from conventional manual line-by-line "exploratory trip", to line selection with the use of a fault line selection device and a fault indicator, and then to quick fault isolation by the feeder automation technology, all the fault removal technology leads to long power outage time and high investment cost, and seriously reduces the power supply reliability of the power distribution system.

To this end, active are suppression methods for suppressing current and voltage at fault points have been studied at home and abroad. For example, in the article "*Ground Fault Neutralizer Full-Compensation Technology and Application*" published by Swedish Neutral Corporation in 2015, an active current are suppression method was disclosed: When a ground fault occurs, ground residual current is taken as a control target, current is injected into a neutral point through a residual current compensator to compensate ground fault full current (including reactive component residual current and active component residual current), and the voltage of the fault point is simultaneously reduced to zero, thereby achieving the purpose of full compensation on the ground fault current. This method is difficult to apply in practice because the fault residual current cannot be directly measured and the line zero sequence active current component is difficult to measure accurately.

The inventor proposed a distribution network ground fault are suppression and protection method (Patent Application No. 201110006701.2) in 2011, in which certain current is injected into the distribution network to force the fault phase voltage and the ground fault current to zero, thereby achieving 100% are suppression of instantaneous faults and rapid isolation of permanent faults, and solving the technical problems of poor are suppression effect of the current are suppression method and low reliability of the conventional protection method. However, this method may cause the non-fault phase voltage to rise $\sqrt{3}$ times, and the long-term operation poses a threat to electrical insulation, and causes breakdown of a weak insulation position of the non-fault phase, which is then developed into an inter-phase short circuit to affect the power supply reliability.

In short, the prior art cannot balance the power supply reliability and safety of the non-effective ground system.

SUMMARY

In order to overcome the above shortcomings of the prior art and effectively solve the problem that the prior art cannot balance the power supply reliability and safety, the present invention provides a safe processing method for active voltage reduction of a ground fault phase of a non-effective ground system, by which the fault phase voltage is reduced to achieve the goal of long-time safe and stable operation of the system. The objective of the present invention is realized by the following technical solution:

A safe processing method for active voltage reduction of a ground fault phase of a non-effective ground system, for use in safe processing of a ground fault of a neutral point non-effective ground generator or distribution network, characterized in that:

non-effective ground system side windings of a transformer are provided with a plurality of shunting taps, serial numbers of shunting taps of each phase are defined to sequentially increase from a neutral point to an output, the shunting tap X is short-circuited to a ground to force an output voltage of the phase to be $U_X = E \cdot (N - N_X)/N$, and the larger serial number of the shunting tap short-circuited to the ground is, the lower the output voltage of the corresponding fault phase is; when a single-phase ground fault occurs, a transformer shunting tap is selected according to a target value $U_2$ of a voltage reduction operation of the ground fault phase, and selected the shunting tap with a smallest serial number, selected according to the fact that the number of turns of coils from the neutral point to the shunting tap is greater than $N-N \cdot U_2/E$, is short-circuited to the ground to implement safe operation processing of active voltage reduction; where E is a power phase voltage, N is a total number of turns of coils of each phase of winding, $N_X$ is a number of turns of coils from the shunting tap X to the neutral point in a fault phase winding, the target value $U_2$ of the voltage reduction operation of the ground fault phase is $(0, U_1)$, and $U_1$ is a fault phase voltage before the shunting tap is short-circuited to the ground.

In order to better achieve the objective of the present invention, the present invention may further adopt the following technical means:

During voltage reduction operation of the distribution network, a zero sequence current of a ground fault line is measured; if the zero sequence current is greater than a threshold, the shunting tap is sequentially increased and changed to short-circuit to the ground, so that the fault phase voltage is further reduced to suppress the fault current until the zero sequence current of the ground fault line is smaller than or equal to the threshold, and safe operation of active voltage reduction of the ground fault phase is achieved.

Further, during the voltage reduction operation, the output current $\dot{I}$ of the non-effective ground system side windings is measured and calculated, and the shunting tap is sequentially increased and changed to short-circuit to the ground to establish formula $\dot{I}=\Delta\dot{U}_0 \cdot \Sigma Y_0$, so that the are of the fault point is suppressed, where $\Sigma Y_0$ is a zero sequence admittance to the ground when the non-effective ground system runs normally.

Further, during the voltage reduction operation, a damping rate $$d = \frac{g}{\omega C} = \frac{U_0 g}{U_0 \omega C} = \frac{I_{0R}}{I_{0C}} = \frac{P_0}{Q_0} = \cot\alpha_0$$

of the non-effective ground system or the ground fault line is measured and calculated; if the damping rate d is greater than a threshold, the shunting tap is sequentially increased and changed to short-circuit to the ground, so that the fault phase voltage is further reduced to suppress the fault arc until d is smaller than or equal to the threshold, that is, fault arc blowout is determined, and safe operation of active voltage reduction of the ground fault phase is achieved; where g is a three-phase conductance to the ground, ω is an angular frequency of the system, C is an three-phase capacitance to the ground, and $U_0$ is a zero sequence voltage; $I_{0R}$ is a zero sequence active current, and $I_{0C}$ is a zero sequence capacitance current; $P_0$ is a zero sequence active power, $Q_0$ is a zero sequence reactive power, and $\alpha_0$ is a zero sequence admittance angle.

Further, when the shunting tap is short-circuited to the ground, in order to prevent excessive inrush current, the shunting tap is firstly short-circuited to the ground through an impedance Z; if a short-circuit current is smaller than a short-circuit current threshold, the impedance is short-circuited, so that the shunting tap X is directly short-circuited to the ground; otherwise, a fault phase selection error is determined, and the impedance is disconnected.

Further, a protection device is arranged between the shunting tap X and the ground to prevent a high current from flowing through a short-circuited loop to damage equipment.

Further, the transformer is a Z-type ground transformer or a Y/Δ wiring transformer or a Y/Y/Δ wiring transformer.

Further, a number of shunting taps of each phase of winding at the non-effective ground system side is set in a range of 1-30.

Further, a zero sequence current threshold is selected according to the fault current allowed by long-time safe operation of a line with a single-phase ground fault and is [1 A, 30 A], or selected according to the suppression rate of the ground fault current and is [0.001 $I_0$, $I_0$), where $I_0$ is a zero sequence current of the fault line before the shunting tap is short-circuited to the ground.

Further, the value of the impedance Z is [10, 500] ohm; a threshold of the short-circuit current is $K_1 U_0/Z_0$, where $U_0$ is measured zero sequence voltage, $Z_0$ is a zero sequence impedance of the non-effective ground system during normal operation, $K_1$ is a safety factor and is [1, 3].

It should be noted that, in the development process of the present invention, the inventor found whether an are is reignited actually depends on the relative magnitude between the recovery voltage of the fault phase and the arc reignition voltage after the current crosses zero. Thus, zero sequence current is injected to force the fault phase voltage to fall. When the voltage falls below the arc reignition voltage of the fault point, the are cannot be reignited, and the current at the fault point is suppressed to zero, that is, the fault current is removed. The fault phase voltage is not required to fall to zero, so that the rising amplitude of the non-fault phase voltage can be reduced, the risk of insulation breakdown of the non-fault phases is reduced, and the relative safe and stable operation time of the system with single-phase ground fault is prolonged. Moreover, the engineering guide specifies that long-time safe and stable operation can be realized as long as the fault current, or zero sequence current, or fault phase voltage or zero sequence voltage of a ground fault generator or a ground fault line of a non-effective ground system is controlled within a permissible range.

In addition, the inventor pioneered the theory of voltage reduction operation of a ground fault phase of a non-effective ground system. Based on the theory, the present invention first proposes a technical solution of short-circuiting to ground at a winding of a shunting tap of a transformer. This technical solution greatly simplifies the control method of fault suppression.

The present invention has the following beneficial effects.

(1) Short-circuiting to ground at a winding of a shunting tap is proposed for the first time to realize flexible control on the fault phase voltage and reduce the fault phase voltage. (2) The rising amplitude of the non-fault phase voltage is reduced, the risk of insulation breakdown of non-fault phases is reduced, and insulation layers of the non-fault phases can be effectively prevented from being damaged. (3) The power supply reliability and safety are greatly improved, power outage accidents can be effectively prevented, and the safety risks for personal and equipment are reduced. (4) Long-time safe and stable operation with a ground fault can be realized.

DETAILED DESCRIPTION

The following further describes and interprets the present invention with reference to the accompanying drawings.

Figure 1:
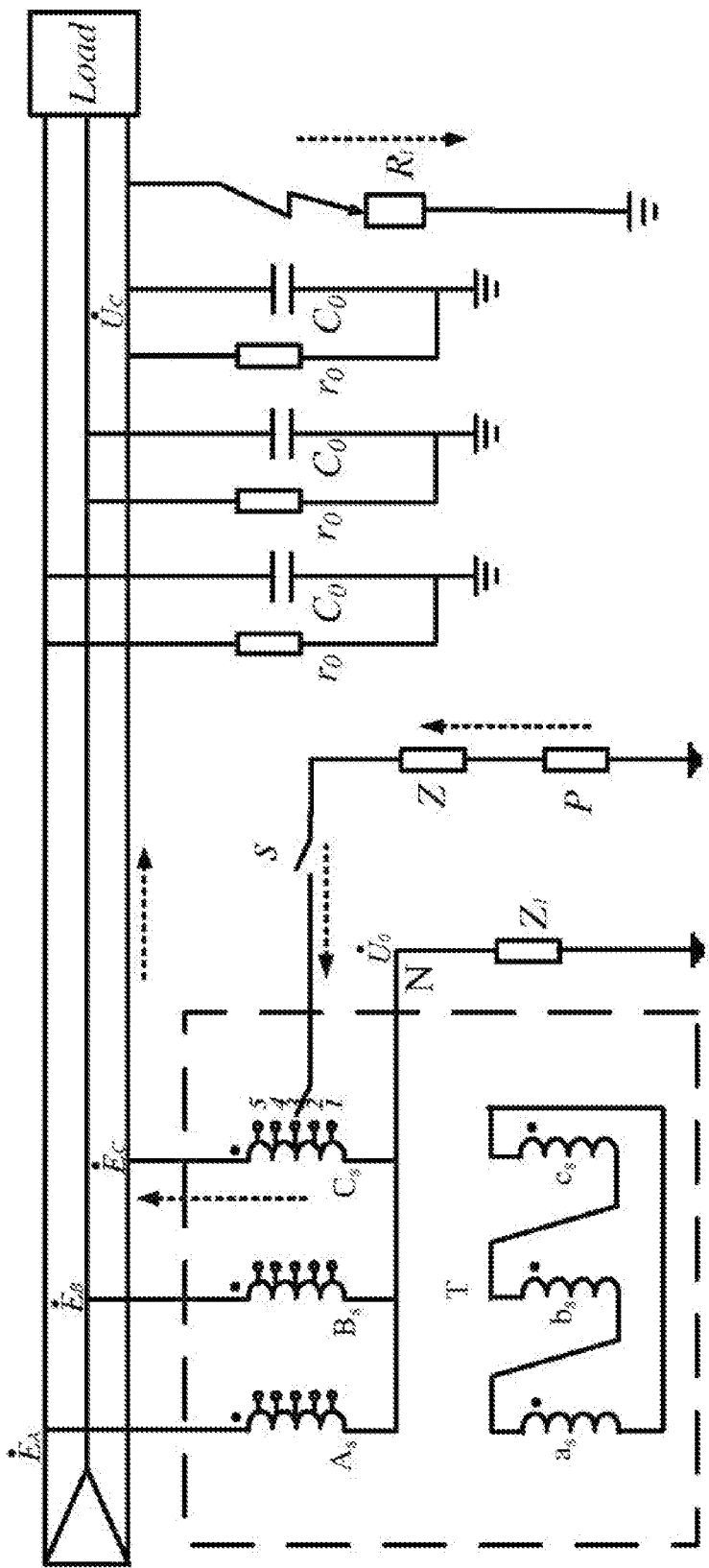
FIG. 1 is a principle diagram of a safe processing method for active voltage reduction of a ground fault phase of a non-effective ground distribution network using a Y/Δ wiring transformer.

As shown in FIG. 1, in a non-effective ground distribution network, $E_A$, $E_B$ and $E_C$ are three phases of power electromotive forces of a system, $C_0$ is system capacitance to ground, $r_0$ is leakage resistance to ground, $A_s$, $B_s$ and $C_s$ are non-effective ground system side windings of a Y/Δ wiring transformer, S is a switch, P is a protection device (an overcurrent protection device or a fuse), outlet lines at respective one ends of the non-effective ground system side windings of the transformer are directly connected with three phases A, B and C of a non-effective ground system, and the non-effective ground system side windings of the transformer are star-connected to lead out a neutral point N and then grounded through an impedance $Z_1$; $a_s$, $b_s$ and $c_s$ are low-voltage side windings of the transformer, and the low-voltage side windings are delta-connected; the non-effective ground system side windings of the transformer are provided with a plurality of shunting taps (the plurality of shunting taps refers to totally three or more shunting taps of three phases of windings A, B and C), the number of shunting taps of each phase of winding is 1 to 30, the serial numbers of shunting taps of each phase are defined to sequentially increase from the neutral point to the terminal, and any shunting tap X is short-circuited to ground to force the output voltage of the phase to be $U_X=E*(N-N_X)/N$, where E is a power phase voltage, N is a total number of turns of coils of each phase of winding, and $N_X$ is a number of turns of coils from the shunting tap X to the neutral point in a fault phase winding. At the same time, in order to prevent high current from flowing through the short-circuited loop to damage equipment, a protection device P is installed between the shunting tap X and the ground. When a single-phase ground fault occurs, the ground fault resistance is $R_f$, and a transformer shunting tap is selected according to a target value $U_2$ of voltage reduction operation of the ground fault phase. The shunting tap with the smallest serial number, selected according to the fact that the number of turns of coils from the neutral point to the shunting tap is greater than $N-N\cdot U_2/E$, is short-circuited to ground to implement safe operation processing of active voltage reduction; where the target value $U_2$ of voltage reduction operation of the ground fault phase is $(0, U_1)$, and $U_1$ is a fault phase voltage before the shunting tap is short-circuited to ground.

Figure 2:
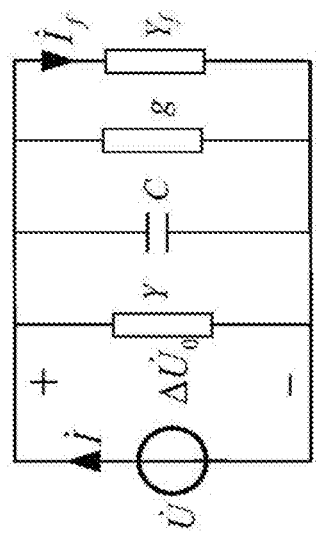
FIG. 2 is a zero sequence equivalent circuit diagram of a non-effective ground system when a ground fault occurs.

A zero sequence equivalent circuit in the non-effective ground system corresponding to FIG. 1, i.e., a zero sequence equivalent circuit of the non-effective ground system when a ground fault occurs, is as shown in FIG. 2. According to the Kirchhoff current equation, the output current $\dot{I}\dot{I}$ of the non-effective ground system side windings of the transformer is:

$$\dot{I} = j3\dot{U}_0\omega C_0 + \frac{3\dot{U}_0}{r_0} + \frac{\dot{U}_C}{R_f} + \frac{\dot{U}_0}{Z_1} = \dot{U}_0\sum Y_0 + \dot{U}_0 Y_f. \quad (1)$$

In equation (1), the zero sequence admittance to ground of the distribution network is $$\sum Y_0 = \frac{1}{Z_1} + j3\omega C_0 + \frac{3}{r_0} = Y + j\omega C + g,$$

the grounding admittance of the neutral point is $$Y = \frac{1}{Z_1},$$

the three-phase conductance to ground is $$g = \frac{3}{r_0},$$

the three-phase capacitance to ground is $C=3C_0$, the fault conductance to ground is $$Y_f = \frac{1}{R_f},$$

and $\dot{U}_0$ is a zero sequence voltage.

Considering the zero sequence voltage effect caused by asymmetry of three-phase ground parameters under normal operation of the non-effective ground system, the zero sequence voltage $U_0$ in equation (1) is replaced by a zero sequence voltage variation $\Delta\dot{U}_0$; and considering the grounding admittance $Y_f=0$ of the fault point after fault arc suppression, equation (1) may be simplified as:

$$\dot{I}=\Delta\dot{U}_0\cdot\Sigma Y_0=(\dot{U}_{03}-\dot{U}_{01})\cdot\Sigma Y_0=(\dot{U}_3-\dot{U}_1)\cdot\Sigma Y_0. \quad (2)$$

Thus, during voltage reduction operation, the output current $\dot{I}$ of the non-effective ground system side windings is measured and calculated, and the shunting tap is sequentially increased and changed to short-circuit to ground to establish formula $\dot{I}=\Delta\dot{U}_0\cdot\Sigma Y_0$, so that the are of the fault point is suppressed, where $\Sigma Y_0$ is a zero sequence admittance to ground when the non-effective ground system runs normally.

In the present embodiment, when a shunting tap is short-circuited to ground, in order to prevent excessive inrush current, the shunting tap is firstly short-circuited to ground through the impedance Z. If the short-circuit current is smaller than a short-circuit current threshold, the impedance is short-circuited, so that the shunting tap X is directly short-circuited to ground. Otherwise, a fault phase selection error is determined, and the impedance is disconnected.

Figure 3:
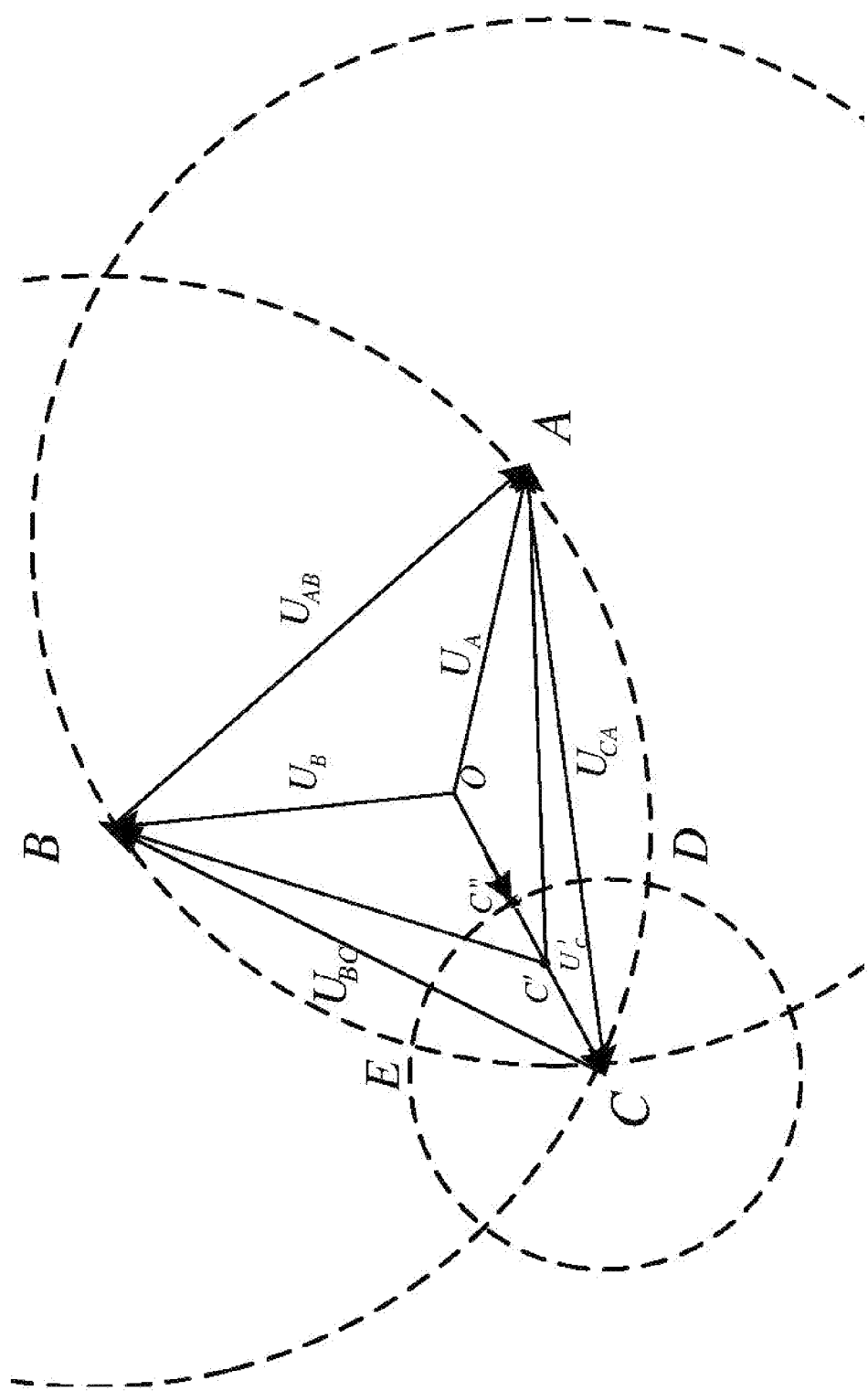
FIG. 3 is a phasor diagram of a voltage reduction are suppression operation range of a ground fault phase of the non-effective ground system.

The following further discusses a fault phase voltage reduction operation range of fault are suppression. As shown in FIG. 3, when the system is in normal operation, the voltage of the neutral point is zero, the A phase voltage vector is $\overrightarrow{OA}$, the B phase voltage vector is $\overrightarrow{OB}$, and the C phase voltage vector is $\overrightarrow{OC}$; taking the ground fault of the C phase as an example, if the maximum operating voltage amplitude of the fault phase ensuring fault phase are suppression is CC", the condition of fault phase are suppression is: the zero potential point is within a circle centering on C and having a radius of CC"; in addition, in order to prevent insulation breakdown caused by excessive voltage of a non-fault phase, the voltage of the non-fault phase is required to be smaller than a line voltage, that is, the zero potential point should be within a circle centering on point A and having a radium of AC, and a circle centering on point B and having a radium of BC. Thus, in order to ensure long-time safe operation of the non-effective ground system after voltage reduction of the fault phase, the zero potential point after voltage reduction of the fault phase is within an intersection of the three circles.

Figure 4:
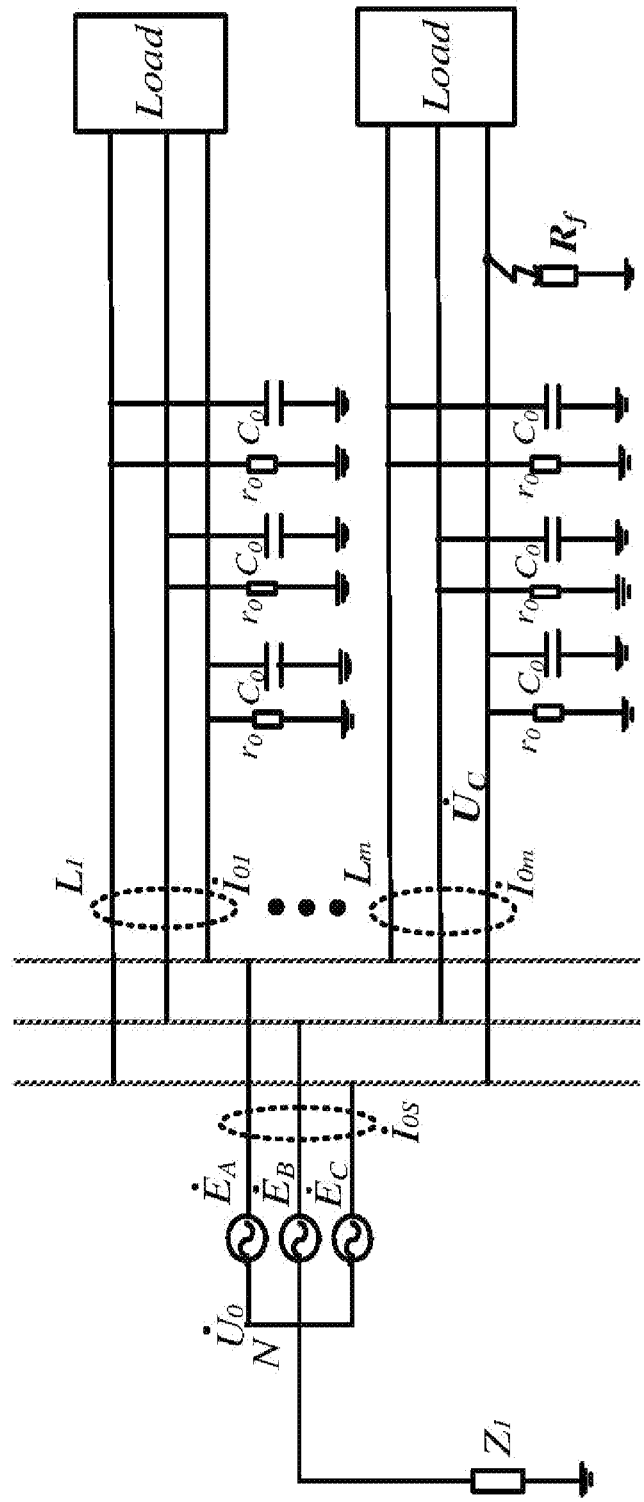
FIG. 4 is a measurement principle diagram of damping rate of a non-effective system or a line.

The following further discusses a method of judging fault are suppression by measuring a damping rate. As shown in FIG. 4, during voltage reduction are suppression, the damping rate of the system is calculated by measuring the zero sequence current $\dot{I}_{0s}$ and zero sequence voltage of the system, or the damping rate of the fault line m is calculated by measuring the zero sequence current $\dot{I}_{0m}$ and zero sequence voltage of the fault line m. The calculation formula of the damping rate of the non-effective ground system or the damping rate of the line is:

$$d = \frac{g}{\omega C} = \frac{U_0 g}{U_0 \omega C} = \frac{I_{0R}}{I_{0C}} = \frac{P_0}{Q_0} = \cot\alpha_0,$$

and the threshold of the damping rate d is set to be $K_3$ times the damping rate of the system or the line in normal operation; the coefficient $K_3$ is in a range of [1,5]; if the damping rate d is greater than the threshold, the shunting tap is sequentially increased and changed to short-circuit to ground, so that the fault phase voltage is further reduced to suppress the fault arc until d is smaller than or equal to the threshold, that is, fault arc blowout is determined, and safe operation of active voltage reduction of the ground fault phase is achieved; where $$g = \frac{3}{r_0}$$

is three-phase
conductance to ground, ω is angular frequency of the system, $C=3C_0$ is three-phase capacitance to ground, and $U_0$ is zero sequence voltage; $I_{0R}$ is zero sequence active current, and $I_{0C}$ is zero sequence capacitance current; $P_0$ is zero sequence active power, $Q_0$ is zero sequence reactive power, and $\alpha_0$ is zero sequence admittance angle.

Figure 5:
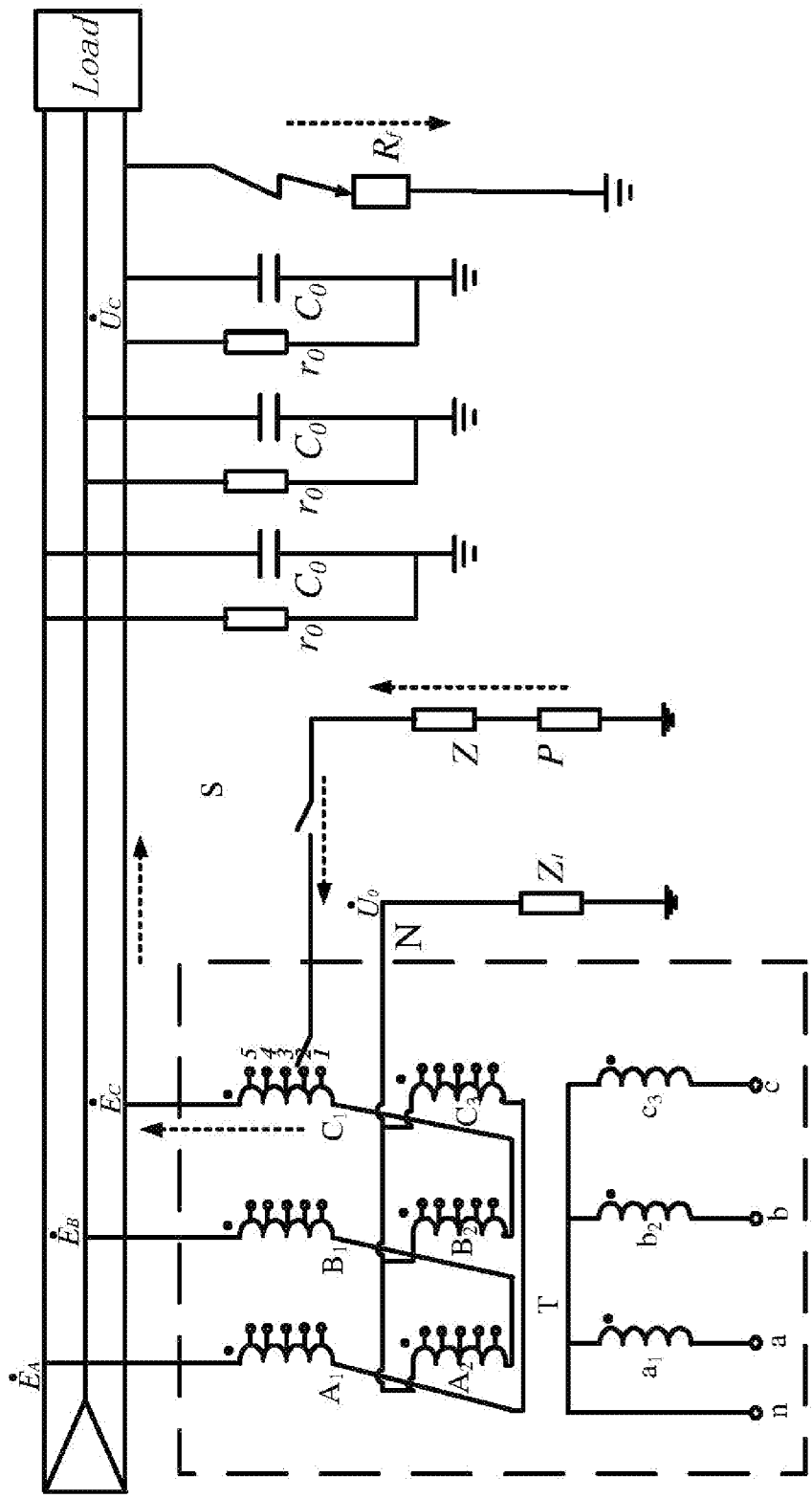
FIG. 5 is a principle diagram of a safe processing method for active voltage reduction of a ground fault phase of a non-effective ground distribution network using a Z-type ground transformer.

As shown in FIG. 5, the Y/Δ wiring transformer in the present embodiment may be replaced by a Z-type ground transformer. Similarly, the Y/Δ wiring transformer in the present embodiment may also be replaced by a Y/Y/Δ wiring transformer.

The above describes the technical principle of the present invention applied to a non-effective ground distribution network in detail. The technical principle is also applicable to the case where the present invention is applied to a non-effective ground generator. The following further describes the application of the present invention to the non-effective ground distribution network and generator:

In the first case, as shown in FIG. 1, in the non-effective ground distribution network, $E_A=E_B=E_C=10/\sqrt{3}$ kV, the leakage resistance to ground of line $r_0$ is 4.7 kΩ, the capacitance to ground of line $C_0$ is 8.36 uF, P is a protection device (an overcurrent protection device or a fuse), the target value $U_2$ of voltage reduction operation of the ground fault phase is set to 2.4 kV, the zero sequence current threshold of the ground fault line is 10 A, the ground impedance $Z_1$ of the neutral point N is j121Ω, $A_s$, $B_s$ and $C_s$ are non-effective ground system side windings of the Y/Δ wiring transformer, the outgoing lines of $A_s$, $B_s$ and $C_s$ are respectively connected to three phases of buses A, B and C, the total numbers (N) of turns of coils of the windings $A_s$, $B_s$ and $C_s$ are respectively 150, totally 15 shunting taps are arranged in the windings $A_s$, $B_s$ and $C_s$, that is, the windings $A_s$, $B_s$ and $C_s$ are respectively provided with 5 shunting taps, and the serial numbers of shunting taps of each phase are defined to sequentially increase from the neutral point to the terminal, respectively shunting tap 1, shunting tap 2, shunting tap 3, shunting tap 4, and shunting tap 5; the number of turns of coils from the shunting tap 1 to the neutral point is 30, the number of turns of coils from the shunting tap 2 to the neutral point is 60, the number of turns of coils from the shunting tap 3 to the neutral point is 90, the number of turns of coils from the shunting tap 4 to the neutral point is 120, and the number of turns of coils from the shunting tap 5 to the neutral point is 150. Before a single-phase ground fault occurs in phase C and the shunting taps are not short-circuited, it is detected that the voltage $U_1$ of the fault phase is 2.6 kV and the ground fault resistance $R_f$ is 1 kΩ. At this time, the voltage $U_1$ of the fault phase C is subjected to voltage reduction for safe processing, the shunting tap 3 with the smallest serial number, selected according to the fact that the number of turns of coils from the neutral point to the shunting tap is greater than $N-N \cdot U_2/E = 88.5$, is short-circuited to ground. The number $N_3$ of turns of coils from the shunting tap 3 to the neutral point is 90, and the fault phase voltage is then reduced to $U_3 = E_C \cdot (N-N_3)/N = 2.3$ kV, which satisfies the voltage operation range [0, 2.60 kV] of the fault phase. At the moment, the non-fault phase voltage is 7.2 kV, which is smaller than the line voltage 10 kV. Thus, arc suppression of the ground fault phase is realized. Meanwhile, the non-fault phase voltage also does not rise to the line voltage, so that safe operation processing of active voltage reduction is achieved.

During voltage reduction safe processing, the zero sequence current of the ground fault line is measured. If it is greater than the threshold 10 A, the shunting tap is sequentially increased and changed to short-circuit to ground, so that the fault phase voltage is further reduced to suppress the fault current until the zero sequence current of the ground fault line is smaller than or equal to the threshold 10 A, and safe processing of active voltage reduction of the ground fault phase is achieved.

In order to prevent excessive inrush current, the shunting tap is firstly short-circuited to ground by the impedance Z. If the short-circuit current is smaller than the short-circuit current threshold, the impedance is short-circuited, so that the shunting tap X is directly short-circuited to ground. Otherwise, a fault phase selection error is determined, and the impedance is disconnected. The value of the impedance Z is 10 ohm.

Figure 6:
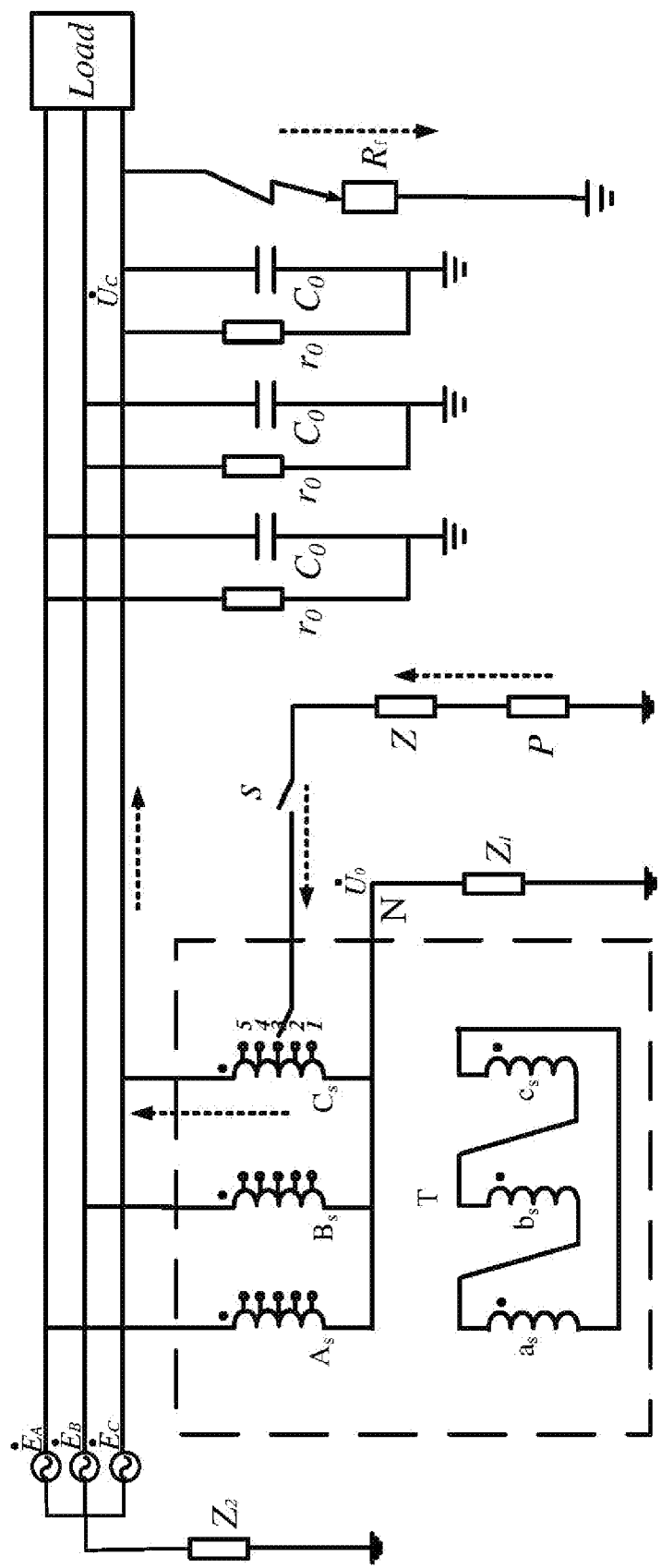
FIG. 6 is a principle diagram of a safe processing method for active voltage reduction of a ground fault phase of a non-effective ground generator.

In the second case, as shown in FIG. 6, in the non-effective ground generator, $E_A=E_B=E_C=20/\sqrt{3}$ kV, the ground leakage resistance $r_0$ of the generator stator is 20 kΩ, the ground capacitance $C_0$ of the generator stator is 1.81 uF, P is a protection device (an overcurrent protection device or a fuse), the target value $U_2$ of voltage reduction operation of the ground fault phase is set to 2.6 kV, the threshold of the damping rate d is $K_3$ times the damping rate of the system or the line in normal operation, the coefficient $K_3$ is 3, the damping rate in normal operation is 8.8%, the ground impedance $Z_2$ of the neutral point N is j600Ω, $A_s$, $B_s$ and $C_s$ are non-effective ground system side windings of the Y/Δ wiring transformer, the outgoing lines of $A_s$, $B_s$ and $C_s$ are respectively connected to three phases of buses A, B and C, the total numbers (N) of turns of coils of the windings $A_s$, $B_s$ and $C_s$ are respectively 150, totally 15 shunting taps are arranged in the windings $A_s$, $B_s$ and $C_s$, that is, the windings $A_s$, $B_s$ and $C_s$ are respectively provided with 5 shunting taps, and the serial numbers of shunting taps of each phase are defined to sequentially increase from the neutral point to the exit, respectively shunting tap 1, shunting tap 2, shunting tap 3, shunting tap 4, and shunting tap 5; the number of turns of coils from the shunting tap 1 to the neutral point is 30, the number of turns of coils from the shunting tap 2 to the neutral point is 60, the number of turns of coils from the shunting tap 3 to the neutral point is 90, the number of turns of coils from the shunting tap 4 to the neutral point is 120, and the number of turns of coils from the shunting tap 5 to the neutral point is 150.

Before a single-phase ground fault occurs in phase C and the shunting taps are not short-circuited, it is detected that the voltage $U_1$ of the fault phase is 2.76 kV and the ground fault resistance $R_f$ is 2 kΩ. At this time, the voltage $U_1$ of the fault phase C is reduced for safe processing, the shunting tap 4 with the smallest serial number, selected according to the fact that the number of turns of coils from the neutral point to the shunting tap is greater than $N-N \cdot U_2/E=116.2$, is short-circuited to ground. The number $N_4$ of turns of coils from the shunting tap 4 to the neutral point is 120, and the fault phase voltage is then reduced to $U_4=E_C \cdot (N-N_4)/N=2.31$ kV, which satisfies the voltage operation range [0, 2.76 kV] of the fault phase. At the moment, the non-fault phase voltage is 14.42 kV, which is smaller than the line voltage 20 kV. Thus, arc suppression of the ground fault phase is realized. Meanwhile, the non-fault phase voltage also does not rise to the line voltage, so that safe operation processing of active voltage reduction is achieved.

During voltage reduction safe processing, the damping rate of the non-effective ground generator is measured. If the damping rate d is greater than the threshold 3×8.8%=26.4%, the shunting tap is sequentially increased and changed to short-circuit to ground, so that the fault phase voltage is further reduced to suppress the fault arc until d is smaller than or equal to the threshold 3×8.8%=26.4%, that is, fault arc blowout is determined, and safe operation of active voltage reduction of the ground fault phase is achieved In order to prevent excessive inrush current, the shunting tap is firstly short-circuited to ground by the impedance Z. If the short-circuit current is smaller than the short-circuit current threshold, short-circuiting the impedance, so that the shunting tap X is directly short-circuited to ground. Otherwise, a fault phase selection error is determined, and the impedance is disconnected. The value of the impedance Z is 10 ohm.

What is claimed is:

1. A safe processing method for active voltage reduction of a ground fault phase of a non-effective ground system, for use in safe processing of a ground fault of a neutral point non-effective ground generator or distribution network, wherein non-effective ground system side windings of a transformer are provided with a plurality of shunting taps, serial numbers of shunting taps of each phase are defined to sequentially increase from a neutral point to an output, the shunting tap X is short-circuited to a ground to force an output voltage of the phase to be $U_x=E \cdot (N-N_x)/N$, and the larger serial number of the shunting tap short-circuited to the ground is, the lower the output voltage of the corresponding fault phase is;

when a single-phase ground fault occurs, a transformer shunting tap is selected according to a target value $U_2$ of a voltage reduction operation of the ground fault phase, and selected the shunting tap with a smallest serial number, selected according to the fact that the number of turns of coils from the neutral point to the shunting tap is greater than $N-N \cdot U_2/E$, is short-circuited to the ground to implement safe operation processing of active voltage reduction, wherein E is a power phase voltage, N is a total number of turns of coils of each phase of winding, $N_x$ is a number of turns of coils from the shunting tap X to the neutral point in a fault phase winding, the target value $U_2$ of the voltage reduction operation of the ground fault phase is $(0, U_1)$, and $U_1$ is a fault phase voltage before the shunting tap is short-circuited to the ground.

2. The safe processing method for active voltage reduction of the ground fault phase of the non-effective ground system according to claim 1, wherein during voltage reduction operation of the distribution network, a zero sequence current of a ground fault line is measured; if the zero sequence current is greater than a threshold, the shunting tap is sequentially increased and changed to short-circuit to the ground, so that the fault phase voltage is further reduced to suppress the fault current until the zero sequence current of the ground fault line is smaller than or equal to the threshold, and safe operation of active voltage reduction of the ground fault phase is achieved.

3. The safe processing method for active voltage reduction of the ground fault phase of the non-effective ground system according to claim 2, wherein a zero sequence current threshold is selected based on the fault current allowed for long-time safe operation of a line with a single-phase ground fault and is [1A, 30A], or selected based on the suppression rate of the ground fault current and is [0.001 $I_0$, $I_0$], where $I_0$ is a zero sequence current of the fault line before the shunting tap is short-circuited to the ground.

4. The safe processing method for active voltage reduction of the ground fault phase of the non-effective ground system according to claim 1, wherein during the voltage reduction operation, the exit current $\dot{I}$ of the non-effective ground system side windings is measured and calculated, and the shunting tap is sequentially increased and changed to short-circuit to the ground to establish formula $\dot{I}=\Delta \dot{U}_0 \cdot \Sigma Y_0$, so that an arc of the fault point is suppressed, where $\Sigma Y_0$ is a zero sequence admittance to the ground when the non-effective ground system runs normally.

5. The safe processing method for active voltage reduction of the ground fault phase of the non-effective ground system according to claim 1, wherein during the voltage reduction operation, a damping rate $$d = \frac{g}{\omega C} = \frac{U_0 g}{U_0 \omega C} = \frac{I_{0R}}{I_{0C}} = \frac{P_0}{Q_0} = \cot \alpha_0$$

of the non-effective ground system or the ground fault line is measured and calculated; if the damping rate d is greater than a threshold, the shunting tap is sequentially increased and changed to short-circuit to the ground, so that the fault phase voltage is further reduced to suppress the fault arc until d is smaller than or equal to the threshold, that is, fault arc blowout is determined, and safe operation of active voltage reduction of the ground fault phase is achieved; where g is a three-phase conductance to the ground, $\omega$ is an angular frequency of the system, C is a three-phase capacitance to the ground, and $U_0$ is a zero sequence voltage; $I_{OR}$ is a zero sequence active current, and $I_{OC}$ is a zero sequence capacitance current; $P_0$ is a zero sequence active power, $Q_0$ is a zero sequence reactive power, and $\alpha_0$ is a zero sequence admittance angle.

6. The safe processing method for active voltage reduction of the ground fault phase of the non-effective ground system according to claim 1, wherein when the shunting tap is short-circuited to the ground, in order to prevent excessive inrush current, the shunting tap is firstly short-circuited to the ground through an impedance Z; if a short-circuit current is smaller than a short-circuit current threshold, short-circuiting the impedance Z, so that the shunting tap X is directly short-circuited to the ground; otherwise, a fault phase selection error is determined, and the impedance Z is disconnected.

7. The safe processing method for active voltage reduction of the ground fault phase of the non-effective ground system according to claim 6, wherein a value of the impedance Z is [10, 500] ohm; a threshold of the short-circuit current is $K_1 U_0 / Z_0$, where $U_0$ is measured zero sequence voltage, $Z_0$ is a zero sequence impedance of the non-effective ground system during normal operation, $K_1$ is a safety factor and is [1, 3].

8. The safe processing method for active voltage reduction of the ground fault phase of the non-effective ground system according to claim 1, wherein a protection device is arranged between the shunting tap X and the ground to prevent a high current flowing through a short-circuited loop to damage equipment.

9. The safe processing method for active voltage reduction of the ground fault phase of the non-effective ground system according to claim 1, wherein the transformer is a Z-type ground transformer or a Y/$\Delta$ wiring transformer or a Y/Y/$\Delta$ wiring transformer.

10. The safe processing method for active voltage reduction of the ground fault phase of the non-effective ground system according to claim 1, wherein a number of shunting taps of each phase of winding at the non-effective ground system side is set in a range of 1-30.

* * * * *